United States Patent

Boyer

[11] 3,889,801
[45] June 17, 1975

[54] VACUUM CONVEYOR BELT WITH AIR BEARING

[75] Inventor: Harold E. Boyer, Anna, Ohio

[73] Assignee: Bell & Howell Company, Sidney, Ohio

[22] Filed: Oct. 26, 1972

[21] Appl. No.: 301,120

[52] U.S. Cl. .................. 198/184; 271/197; 271/276
[51] Int. Cl. ........................ B65g 15/28; B65h 5/22
[58] Field of Search ......... 271/74 R, 74 MS, 74 PG, 271/74 FC, 194–197, 276; 226/97; 198/184

[56] References Cited
UNITED STATES PATENTS

| | | | |
|---|---|---|---|
| 3,220,723 | 11/1965 | Rabinow | 271/74 |
| 3,425,610 | 2/1969 | Stewart | 271/74 X |
| 3,618,935 | 11/1971 | Howatt | 271/74 X |

FOREIGN PATENTS OR APPLICATIONS

| | | | |
|---|---|---|---|
| 957,867 | 5/1964 | United Kingdom | 34/155 |

Primary Examiner—Evon C. Blunk
Assistant Examiner—Bruce H. Stoner, Jr.
Attorney, Agent, or Firm—Griffin, Branigan and Butler

[57] ABSTRACT

A vacuum conveyor system is described comprising a conveyor belt, having vacuum holes therein, combined with means for simultaneously creating positive and negative pressures on the underside of the conveyor belt. The positive pressure acts on portions of the underside of the conveyor belt where there are no vacuum holes and the negative pressure acts through the vacuum holes on articles conveyed by the conveyor belt. The positive pressure tends to establish an air bearing which reduces belt drag while the negative pressure tends to hold conveyed articles tightly against an upper surface of the conveyor belt.

A more detailed aspect of the disclosure relates to the size relationship between the belt's vacuum holes and a passageway which connects the vacuum holes to a vacuum chamber.

13 Claims, 3 Drawing Figures

PATENTED JUN 17 1975  3,889,801
FIG. 1
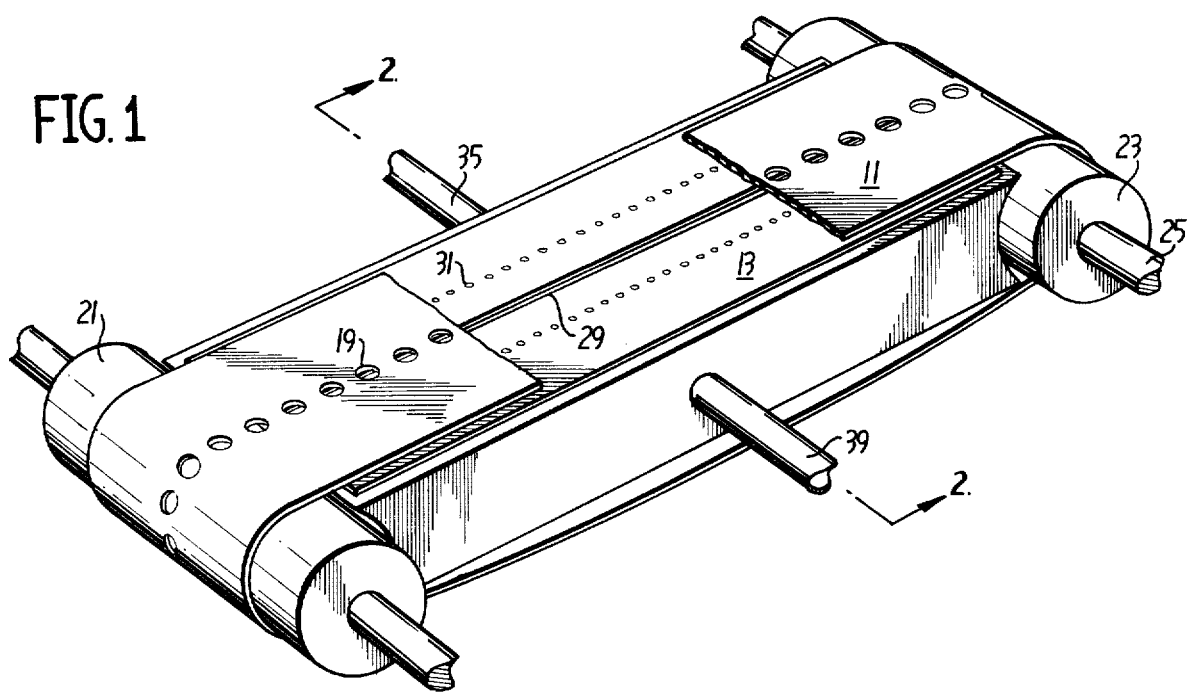
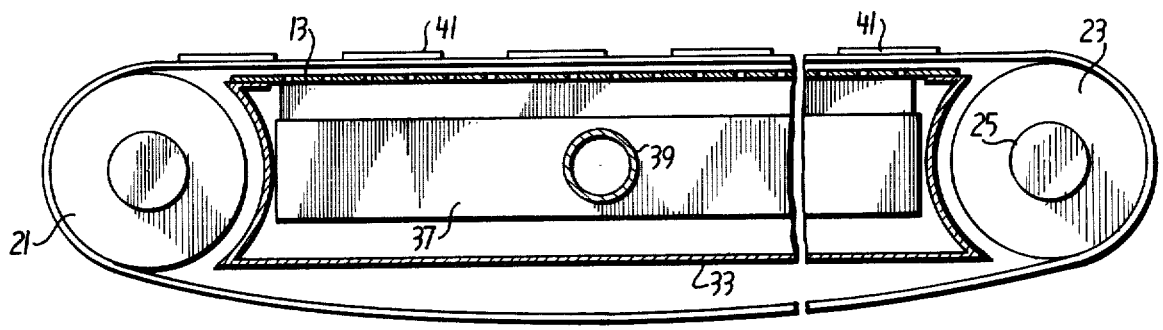
FIG. 2
FIG. 3

VACUUM CONVEYOR BELT WITH AIR BEARING

BACKGROUND OF THE INVENTION

This invention relates broadly to the art of conveyor belts and more specifically to vacuum type conveyor belts.

It is somewhat common to apply a negative pressure (or partial vacuum) to the underside of an air-pervious conveyor belt in order to create a suction which holds conveyed articles tightly against the upper surface of the conveyor belt. However, such an arrangement tends to increase the drag of the conveyor belt by sucking the underside of the conveyor belt against a trackway or support, thereby increasing friction between the underside of the conveyor belt and the support. For example, when such conveyors are used to transport sheets of paper, it is possible that several sheets of paper will create sufficient drag to stall a drive motor or cause belt slippage. Further, the relatively large amount of drag of most prior-art vacuum conveyors tends to produce an undue amount of wear on belts.

Efforts have been made to overcome this increased friction in vacuum belts by employing antifriction slide surfaces as used in U.S. Pat. No. 3,425,610 to Stewart.

It has also been suggested to decrease vacuum forces acting on a conveyor belt when large or numerous items cause excessive forces, see U.S. Pat. No. 3,321,121 to Nyberg et al.

Neither of these systems has proven to be totally satisfactory primarily because they do not sufficiently reduce the drag on conveyor belt, and in the latter case it is sometime undesirable to reduce vacuum forces.

It is therefore an object of this invention to provide a vacuum-type conveyor system in which there is not an unduly large amount of drag on the conveying member and which does not require a decrease in vacuum forces.

It is also known in the prior art to employ an air bearing, (or a cushion of air) beneath a conveyor belt to reduce drag on the conveyor belt. For example, U.S. Pat. No. 3,592,334 to Fleischaur teaches the use of such a system. However, it has previously been thought that air bearing systems could not satisfactorily combined with vacuum conveyor systems because the respective positive and negative pressures created under a conveyor belt by these two systems would tend to cancel each other out. In this regard, it is significant that Fleischaur's apparatus can be used either as a vacuum conveyor or as a conveyor having an air bearing; however, he does not appear to teach the use of these concepts simultaneously.

It is also an object of the invention to provide a vacuum portion of the conveyor system wherein there is a suitable balance between the system's required vacuum capacity; the time required for an article to be initially satisfactorily held onto the conveyor; and the ability of the system to compensate for large spaces between conveyed articles.

SUMMARY OF THE INVENTION

According to principles of this invention a conveyor system employs both vacuum forces to hold conveyed articles in position on a conveying member and a cushion of pressurized air to enable the conveying member to slide freely on its trackway or supporting member.

In the particular embodiment disclosed, an endless conveyor belt is supported by an orifice plate. A line of belt-vacuum holes are positioned along the center of the conveyor belt. The orifice plate has a vacuum slot therein positioned below the belt-vacuum holes. The orifice plate also has orifice holes therein, arranged in two lines, the lines being located on opposite sides of the vacuum slot.

A negative pressure (or a partial vacuum) is applied to the slot, thereby creating a suction through the belt vacuum holes which holds articles against the upper surface of the conveyor belt.

A positive pressure is applied to the pressure orifice holes for creating an air bearing between the conveyor belt and the orifice plate.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

FIG. 1 is a partially cutaway isometric view of a vacuum-type conveyor system employing principles of this invention;

FIG. 2 is a cross-sectional view taken on line 2—2 of FIG. 1; and

FIG. 3 is a sectional view taken on line 3—3 in FIG. 2.

DESCRIPTION OF THE PREFERRED EMBODIMENT

Referring now to the drawings, a vacuum-type sheet-paper conveyor system having an air bearing comprises a flat, endless, conveyor belt 11, an orifice plate 13, a source of negative pressure 15 (FIG. 2) and a positive pressure system 17. In this regard, as used in this specification, the terms positive and negative pressures denote respectively pressures above and below atmospheric pressure.

The flat conveyor belt 11 rides on a idler roller 21 and is driven by a driven roller 23. A driven shaft 25 can be driven by various suitable means.

In a preferred embodiment the belt is comprised of a synthetic material 0.050 in. thick by 1.5 in. wide. Located along the centerline of the conveyor belt is a line of vacuum holes 19, 5/16 inch in diameter, each hole thereby having a volume of $3.835 \times 10^{-3}$ in$^3$. The holes are located on 0.5 in. centers. Hence, each foot of belt has total vacuum hole volume of $9.224 \times 10^{-2}$ in$^3$. In this regard, the significance of the vacuum hole volume will become more apparent shortly.

The orifice plate 13 is constructed of ⅛ in. aluminum plate and positioned below the conveyor belt 11, as seen in FIGS. 2 and 3. An 0.010 in. wide vacuum slot 29 is longitudinally oriented in the center of the orifice plate; and rows of pressure holes 31 are positioned 9/32 inch on each side of the vacuum slot 29. There are 84, 0.031 inch in diameter, holes in each row.

Hence, in the illustrated embodiment the cross sectional area of the holes is 0.0505 in.$^2$ per foot of belt length; and the cross sectional area of the vacuum slot is 0.12 in$^2$ per foot of belt length.

The orifice plate 13 is mounted and sealed on a positive-pressure plenum chamber 33, which is part of the positive-pressure system 17. An air supply pipe 35 connects the positive-pressure plenum 33 with a fluid pressure source (not shown) such as a fan, compressor or other suitable device. As can be seen in FIG. 2 air which is supplied to the positive pressure plenum 33 via the air supply pipe 35 is vented to atmosphere through the pressure orifice holes 31.

A vacuum pipe 39 connects a vacuum chamber 37 with a negative-pressure source (not shown) such as a fan, compressor or similar device. Negative pressure applied to the vacuum pipe 39 is transferred via the vacuum chamber 37 to atmosphere through the vacuum slot 29. In one embodiment of the invention the positive pressure plenum 33 and the vacuum chamber 37 form a single integral manifold system as shown.

Describing now the operation of the vacuum-type conveyor system shown in FIGS. 1-3, as articles 41 are conveyed on the conveyor belt 11, a negative pressure acting via the vacuum pipe 39, the vacuum chamber 37, the vacuum slot 29, and the belt vacuum holes 19 tends to hold the articles 41 tightly against the upper surface of the conveyor belt 11.

Simultaneously therewith a positive pressure acting through the air supply pipe 35, the positive pressure plenum 33, and the orifices 31 causes air to blow through the orifices 31 against the underside of the conveyor belt 11. Thus, an air bearing is produced above the orifices 31 which tends to hold the conveyor belt 11 away from the orifice plate 13.

With reference to FIG. 2, when the vacuum conveyor system of this invention is in operation, there is a pressure gradient across the top of the orifice plate 13 such that there are positive pressures above the orifices 31 and a negative pressure above the vacuum slot 29. The negative-pressure forces acting on the belt 11 above the vacuum slot 29 tend to pull the center portion of the conveyor belt 11 toward the orifice plate 13; while the positive pressure forces tend to hold up the sides of the conveyor belt 11 above the orifices 31. The net result is that the belt may be slightly deformed as shown in an exaggerated manner in FIG. 2, but articles 41 are held tightly against the upper surface of the belt and the belt is held away from the oriface plate 13. In this regard, tests have shown that introduction of the air cushion reduces the torque required to drive a vacuum belt tremendously, while causing only a small loss of vacuum forces.

Although there is some interaction between the negative and positive pressures under the conveyor belt 11, it has been found that these pressures do not cancel one another out and that desirable effects of each of the types of pressures are retained. Thus, a desirable suction is created for holding articles 41 against the conveyor belt 11 and at the same time an air bearing is created below the conveyor belt 11. In this regard, experiments have indicated that in one embodiment, such as described above, air escapes from the sides of the conveyor belt 11 at an almost insignificant rate of only 3 cubic feet per minute.

The significance of the above noted vacuum hole; vacuum slot; and pressure hole dimensions is several-fold. Firstly, the spacing between articles that are transported by the belt affects the amount of atmospheric air that is pulled through the vacuum holes and vacuum slot — the larger the spacing, the harder the vacuum system must work.

Secondly, in order for a given type of article to be transported, a predetermined vacuum is desirable in order for given articles to be satisfactorily held onto the belt. In this regard, the total amount of vacuum force that is desired to be exerted on a given article depends not only upon its weight and shape but upon the operations that are to be performed upon the article as it is transported by the belt.

Additionally, prior to the time a given article is vacuum-adhered to the belt, the vacuum holes under the article must be evacuated. The time for such vacuum-hole evacuation is referred to as the belt's "response time"; and the ability of the system to withstand the vacuum loss caused by various distances between articles is referred to as the system's ability to "compensate".

The above factors such as the system's response time and compensation ability are influenced by the ratio (W) of the vacuum-slot area to the vacuum-hole volume. In the above described embodiment the W-ratio is 1.3 in $^{-1}$. In this regard, where the transported articles were paper, the pressure at pipe 35 was regulated to about 12 psi. $\pm$ 1 percent; and the vacuum at pipe 39 was regulated to about 20 in. Hg below atmospheric ($\pm$ 2 percent).

The system's response time was good in that each sheet of paper appeared to be fully adhered to the belt after it was fully fed; and the system's compensation ability was such that vacuum at chamber 37 was only lost to the extent that pressure rose to only 15 in Hg below atmospheric when no articles were on the belt.

In another embodiment of the invention a stainless steel belt was used. The belt was only 0.005 in. thick so that the W-ratio was 13. In that case, the response time appeared to be substantially instantaneous even though less vacuum was required. There was no significant difference in the compensation ability of the two belts when considered in terms of the belt being empty; but the thin belt having the higher W-ratio had a better compensation ability than the lower W-ratio configuration for articles transported by the belt with conventional path spacings therebetween.

It will be appreciated that the optimum W-ratios vary from case to case depending upon many factors such as temperature; belt speed; the configuration of the vacuum hole openings in the belt; and the vacuum openings in the orifice plate. For example, the vacuum slot of the preferred embodiment has less resistance to air-flow for a given cross-sectional area, than if a series of holes were used having the same cross-sectional area. All such factors considered, however, it appears that a preferred W-ratio range is between about 0.5 in $^{-1}$ and 40 in $^{-1}$. It should not drop below about 0.01 in $^{-1}$, however, and where W-ratios exceed about 1000 in $^{-1}$ the required vacuum system becomes almost impractical if acceptable response times and compensation abilities are to be maintained. For extremely large applications, on the other hand, larger W-ratios might prove practical.

The ratio of the system's vacuum-slot area to pressure-hole area is also of significance. In the illustrated embodiment the vacuum-slot to pressure-hole area ratio (Y) is 2.38. This ratio can be decreased as the belt width is increased and/or the air pressure at pipe 35 is decreased. Based upon articles and configurations that have been used thus far, however, it appears that a preferred Y-ratio range is between about 0.5 and 20; and only exceptional circumstances would call for a Y-ratio below about 0.02. On the other hand, the Y-ratio can become larger as the size of individual pressure openings such as holes 31 increase, or as the size of transported articles increases, or as belt width decreases, or as positive pressure is increased, or the system is adjusted to pull a larger vacuum; but it would only be an exceptional case where the Y-ratio would exceed about 250.

Finally, there is also significance to the ratio (Z) of the volume of the belt openings to the area of the positive pressure openings. This is particularly the case where positive pressure air flow is relatively high, in which event, for a given regulated system vacuum, the belt opening volume should be decreased in order to maintain a desired response time. In this regard it presently appears that the Z-ratio should be no less than about 0.05 in. and no more than about 20 in. For the belt configuration described above, however a preferred range is between about 0.1 in. and 10 in. In any event, because this ratio is independent of the area of the vacuum opening it does not appear to be as important as the W-ratio or Y-ratio.

It should be understood by those skilled in the art that the vacuum-type conveyor system described herein not only holds articles tightly to a conveyor belt, but also allows the belt to move freely and easily over a supporting surface. Thus, this invention overcomes the difficulty of undue drag which is often experienced when using vacuum-type conveyors. It is also significant that in overcoming the "undue-drag" problem this invention does not employ a reduction in vacuum, or partially-ineffective antifriction slide surfaces, as do some prior art devices.

As a result of this invention, it is possible to achieve surface speeds and belt life which have been difficult or impossible to obtain with prior-art vacuum conveyors.

While the invention has been particularly shown and described with reference to a preferred embodiment, it will be understood by those skilled in the art that various changes in form and detail may be made therein without departing from the spirit and scope of the invention. For example, the means for supplying negative and positive pressures to the underside of a conveyor belt could have various forms.

In this regard, it is also possible that other orifice arrangements on the orifice plate 13 will function properly in this system, although the arrangement described herein is the best made presently contemplated. Further, the principles employed in this invention have applications in conveyor systems other than endless-belt-type conveyor systems; and the resulting structure is useful in conveying other types of articles in addition to sheet stock.

The embodiments of the invention in which an exclusive property or privilege are claimed are defined as follows:

1. A vacuum-type conveyor system for conveying an article comprising:
   a conveyor belt having a first side for carrying said article and a second side opposite said first side, said conveyor belt including apertures arranged in a narrow longitudinally extending pervious zone of said conveyor belt, and said conveyor belt further including a longitudinally-extending impervious zone positioned on each side of said pervious zone, said impervious zones being substantially free of apertures and being flat on said second side;
   a supporting surface adjacent said second side of said conveyor belt, said supporting surface defining an elongated surface negative-pressure zone, said surface negative-pressure zone being adjacent said belt pervious zone and arranged parallel thereto, said supporting surface further defining a plurality of positive pressure apertures arranged in a plurality of elongated areas of said supporting surface, said elongated areas being parallel to, but separated from said surface negative-pressure zone and respectively lying under said impervious zones of said belt;
   negative fluid-pressure means for creating fluid pressure forces at said surface negative-pressure zone which acts through said surface negative-pressure zone and said belt apertures to hold said article against said first side of said conveyor means; and
   positive fluid-pressure means for creating positive fluid pressure forces at said positive-pressure apertures which act on said second side of said conveyor at said impervious zone, to create a positive pressure air bearing between said impervious zone and said supporting surface to reduce drag caused by said negative pressure.

2. A vacuum-type conveyor as claimed in claim 1 wherein said belt apertures comprise a single row of holes in said belt.

3. A vacuum-type conveyor system as claimed in claim 2 wherein:
   said conveyor means comprises an endless conveyor belt; and
   said surface negative-pressure zone is a longitudinally oriented slot adjacent to the center line of said endless belt.

4. A vacuum-type conveyor system as claimed in claim 3 wherein each of said plurality of positive pressure apertures comprises apertures arranged in a line substantially parallel to said negative-pressure slot.

5. A vacuum-type conveyor system as claimed in claim 1 wherein, said surface negative-pressure zone defines a slot and for a given length of conveyor belt, the ratio (W) of the cross-sectional area of said negative-pressure slot to the volume of said belt apertures is more than 0.01 in.$^{-1}$.

6. The system of claim 5 wherein, for a given length of said conveyor means, the ratio (W) of the cross-sectional area of said negative-pressure slot to the volume of said belt apertures is less than 1000 in$^{-1}$.

7. The system of claim 1 wherein, said surface negative-pressure zone defines a slot and for a given length of said conveyor means, the ratio (W) of the cross-sectional area of said negative-pressure slot to the volume of said belt apertures is between about 0.5 in$^{-1}$ and 40 in$^{-1}$.

8. The system of claim 1 wherein, said surface negative-pressure zone defines a slot and for a given length of said conveyor means, the ratio (Y) of the cross-sectional area of said negative-pressure slot to the cross-sectional area of said belt apertures is more than about 0.02.

9. The system of claim 1 wherein, said surface negative-pressure zone defines a slot and for a given length of said conveyor means, the ratio (Y) of the cross-sectional area of said negative-pressure slot to the cross-sectional area of said belt apertures is less than about 250.

10. The system of claim 1 wherein, said surface negative-pressure zone defines a slot and for a given length of said conveyor means, the ratio (Y) of the cross-sectional area of said negative-pressure slot to the cross-sectional area of said positive apertures is between about 0.5 and 20.

11. The system of claim 1 wherein, for a given length of said conveyor means, the ratio (Z) of the volume of said belt apertures to the cross sectional area of said positive pressure apertures is more than about 0.05 inches.

12. The system of claim 1 wherein, for a given length of said conveyor means, the ratio (Z) of the volume of said belt apertures in said belt to the cross-sectional area of said positive pressure apertures is less than about 20 inches.

13. The system of claim 1 wherein, for a given length of said conveyor means, the ratio (Z) of the volume of said belt apertures to the cross-sectional area of said positive pressure apertures is between about 0.1 inches and 10 inches.

* * * * *